UNITED STATES PATENT OFFICE.

ALANSON P. BRUSH, OF FLINT, MICHIGAN.

TRANSMISSION MECHANISM.

1,186,744.  Specification of Letters Patent.  Patented June 13, 1916.

Application filed May 8, 1911. Serial No. 625,869.

*To all whom it may concern:*

Be it known that I, ALANSON P. BRUSH, a citizen of the United States, residing at Flint, in the county of Genessee and State of Michigan, have invented a certain new and useful Improvement in Transmission Mechanism, of which the following is a full, clear, and exact description.

This invention relates to mechanism adapted for use on automobiles, through which power is transmitted from the crank shaft of an internal combustion engine to the terminal shaft of the transmission mechanism, whereby the latter shaft may be caused to remain idle, if so desired, or may be caused to turn at any of several rates relative to the rate at which the crank shaft turns.

Among the objects sought and realized by this invention are the simplification of such mechanism and the reduction in the number of parts required, a shortening of the mechanism whereby less space will be required to accommodate it, and the production of a simple, durable and efficient unit power plant so constructed that the parts may be assembled outside of the car and then put into (or removed from) the car as a unit.

The invention consists of certain novel combinations of parts which are definitely pointed out in the appended claim, and are shown in the accompanying drawings in the best embodiment known to me; and this embodiment is clearly described in detail in the following specification.

Figure 1:
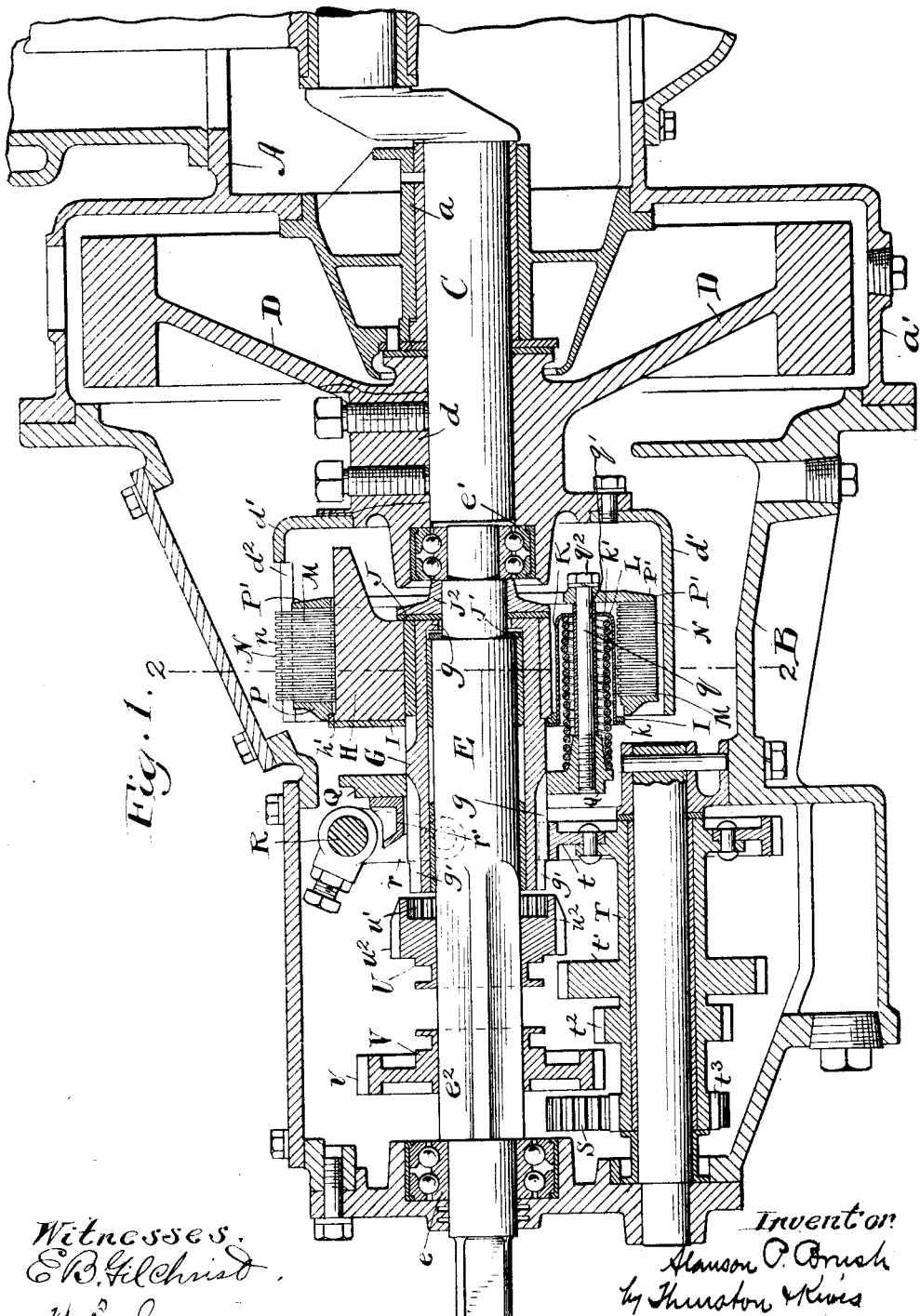
Figure 2:
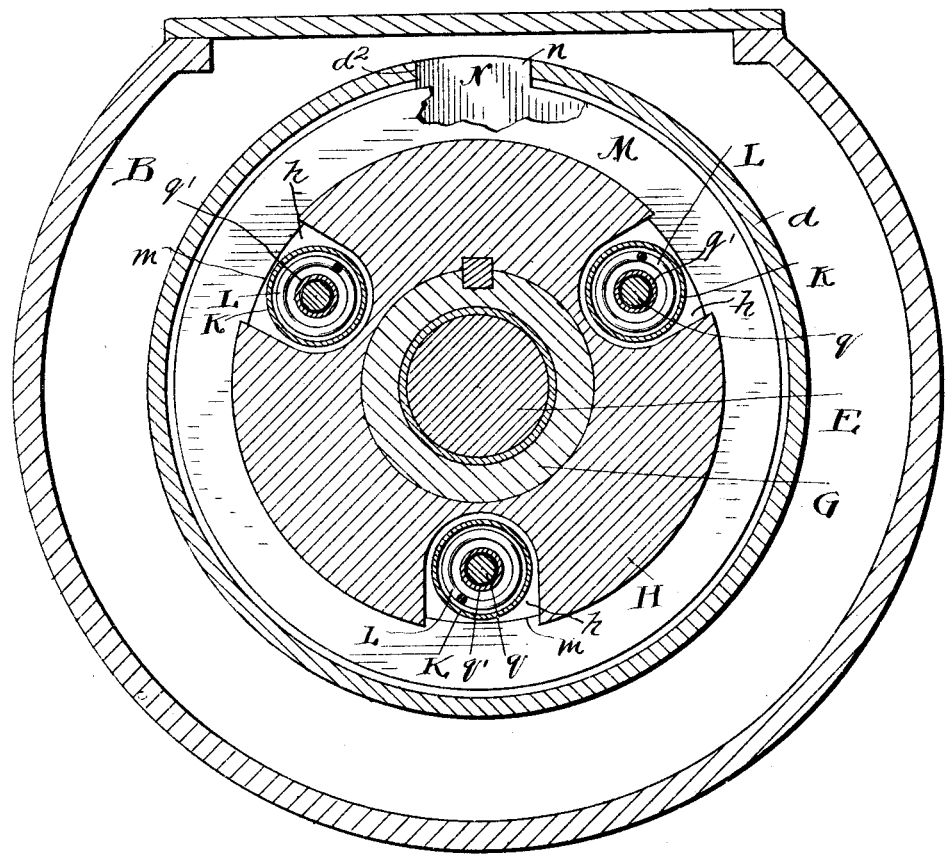

In the drawings, Figure 1 is a central longitudinal vertical section of a unit power plant, in which the invention is embodied. Fig. 2 is a transverse vertical section in the plane indicated by line 2—2 on Fig. 1.

Referring to the parts by letters, A represents the crank case; and B represents a transmission mechanism case which is fixed to the rear end of said crank case and serves to inclose the transmission mechanism, including the clutch. Only the rear end of the crank case is shown, because the front end thereof may be of any ordinary or suitable construction, such as will provide suitable bearings for the front end of the crank shaft C. The rear end of said crank case has a suitable bearing $a$ for the rear end of said crank shaft, which shaft projects rearward through the bearing, and has the hub $d$ of the fly wheel D firmly fixed to said projecting rear end. The crank case is formed with a cylindrical flange $a'$ which serves as a housing to completely inclose said fly wheel, said flange being the part of the crank case to which the transmission mechanism case is fixed.

The rear end of the casing member B supports a suitable bearing $e$ for the rear end of the transmission shaft E,—which shaft is the rear terminal member of the transmission mechanism. The front end of this shaft E is mounted in bearings $e'$ in the rear end of the crank shaft,—or, to more specifically describe the specific construction, said bearings are in the rear end of the fly wheel hub which is rigidly fixed to the crank shaft.

A quill shaft G is rotatably mounted on the shaft E. Endwise movement of the quill shaft is prevented, in the construction shown, by means of an inwardly turned flange $g$ on said quill shaft, which lies between two hardened disks J, J', which embrace the shaft E, one being in contact with a shoulder on said shaft, and one with a distance piece $J^2$ which embraces said shaft. This manner of preventing the endwise movement of said quill shaft is a mere detail of construction and not material to the invention. Rigidly fixed to this quill shaft is one of the disk carriers H which is a part of a multiple disk clutch. The other disk carrying member is a cylindrical flange $d'$ which is concentric with and located around the member H, and is rigidly fixed to the fly wheel hub or crank shaft. A plurality of friction disks M and N are loosely fitted upon the member H. The disks M and N are alternatively placed, and the disks of the series M have tongues $m$ which project inward into longitudinal grooves $h$ in the surface of the member H. The disks of the series N have outwardly projecting tongues $n$ which enter longitudinally extended slots $d^2$ in the flange $d'$.

One fixed disk-like vise jaw P embraces the member H and abuts a shoulder $h'$ thereon,—this vise jaw being at the rear end of the rank of interlocked disks. The movable disk-like vise jaw P' also embraces the member H, and is slidable thereon. When this vise jaw is moved with sufficient force toward the vise jaw P, the disks M and N are pressed into frictional contact such that as the fly wheel revolves, the carrier H and the quill shaft G, to which it is fixed, must also revolve. The specific mechanism shown for causing this frictional engagement of said disks is shown in the drawing as follows: A movable collar Q is slidably mounted on the quill shaft G. Bolts $q$ are screwed into it; and they extend in directions parallel with the shaft E forward, going loosely through holes in the vise jaw P', and the heads $q^2$ of these bolts are to engage the forward face of the vise jaw P'. A tubular spring seat K surrounds each of these bolts. At its front end each of these seats has an outwardly turned flange $k$ for engagement with the front face of a disk I, which embraces the quill shaft and contacts with the end of the carrier H. An expansible coil spring L surrounds each of the rods Q within its associated tubular spring seat. Each spring is compressed and normally thrusts endwise against the inturned flange $k'$ at one end of the spring seat and against the collar Q at the other end thereof. Thus these springs act, when permitted to act, to move the collar Q forward and thereby to move vise jaw P' in the disk compressing direction. This collar Q may be moved in the opposite direction by means of a rock shaft R carrying arms $r$ which are connected with a fork pressure piece $r'$ which engages the rear face of the collar Q. Thus, when this rock shaft is rocked in one direction, such, for example, as will move the collar Q forward (to the right as shown in Fig. 1); the springs L will be compressed as an incident, but this movement of the collar Q will be transmitted through distance tubes $q'$ (which severally embrace the rods $q$ and engage the collar Q and vise jaw P') to the front vise jaw P, which will be moved forward so as to permit the disks M and N to free themselves from pressure contact with one another.

The quill shaft G has near its front end an external gear $g$ which always is in engagement with a gear $t$ which is fixed to the counter-shaft T, the latter being mounted in suitable bearings in the casing member B below the shaft E. There are three other gears $t'$, $t^2$, $t^3$, fixed to the shaft T. On a squared part $e^2$ of shaft E are two sliding gear sleeves U and V. The former has at its front end an internal gear $u'$ adapted to embrace and mesh with the external gear $g'$ on the quill G. It also has an external gear $u^2$ adapted to mesh with the gear $t'$. The other sleeve B has a gear $v$ adapted either to mesh with the gear $t^2$, or with an idler gear S, which is in mesh with the gear $t^3$. It is not pretended there is anything new about this transmission mechanism, excepting only in respect to the manner of mounting the terminal member thereof, to wit, the shaft E, as before explained. It has not, therefore, been thought necessary to show in the drawing the mechanism by which these two sleeves U and V may be selectively moved either forward or backward as may be required to cause the desired interlocking of gears.

From the foregoing description, it will be understood that, at will, by the setting of the clutch disks, the quill shaft G may be driven directly from the crank shaft through the intermediation of a flange which is conveniently made fast to the fly wheel which is fast to the crank shaft. Motion is transmitted from this quill shaft to the shaft E, on which it is rotatably mounted, through suitable shiftable gearing, said shaft E having no supporting bearings, excepting the one at its rear end, and the one at its forward end which is carried by the crank shaft. This construction has the effect of permitting the clutch mechanism and transmission mechanism to occupy a space some five or six inches shorter, measured lengthwise of the crank shaft, than any previous construction with which I am familiar. This is of very great importance in unit power plant construction for automobiles, because the crank case is to be fixed to and supported by the automobile chassis frame, and the casing member B and all the parts therein and supported thereby have their only support through their connection with said crank case.

Having described my invention, I claim:

In an automobile, the combination of a crank case having at its rear end a shaft bearing, a fly wheel housing rigid with and behind said crank case, a transmission case rigid with and behind the fly wheel housing, a crank shaft which is mounted in and extended rearward through the shaft bearing first mentioned, a fly wheel fixed to the projecting rear end of said crank shaft and having its hub extended behind the end of the crank shaft, a transmission shaft which is alined with said crank shaft, a bearing for the rear end of said transmission shaft, a bearing for the front end of said transmission shaft which bearing is carried by the projecting rear end of the hub of the fly wheel, a quill shaft which is rotatably mounted upon said transmission shaft and is wholly supported thereby, clutch mechanism for connecting said quill shaft with said fly wheel, and means, for transmitting power to the transmission shaft from the quill shaft at various relative rates of speed.

In testimony whereof, I hereunto affix my signature in the presence of two witnesses.

ALANSON P. BRUSH.

Witnesses:
E. L. THURSTON,
H. R. SULLIVAN.